Nov. 6, 1951  H. R. FISCHER ET AL  2,574,096
DISTRIBUTING VALVE
Original Filed Dec. 13, 1943   2 SHEETS—SHEET 2
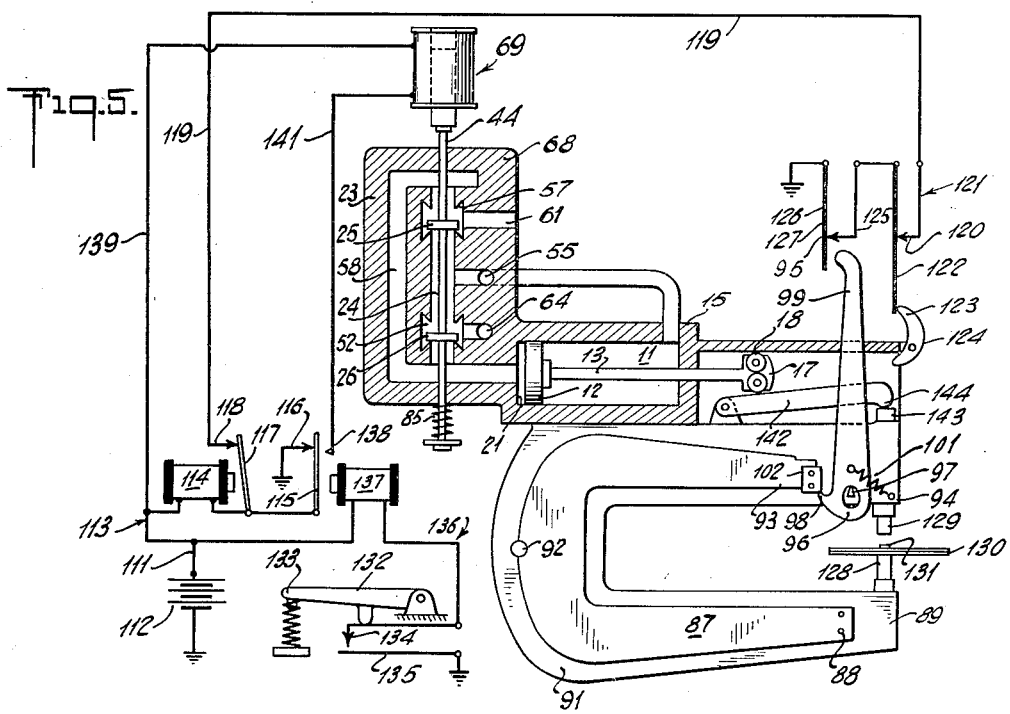
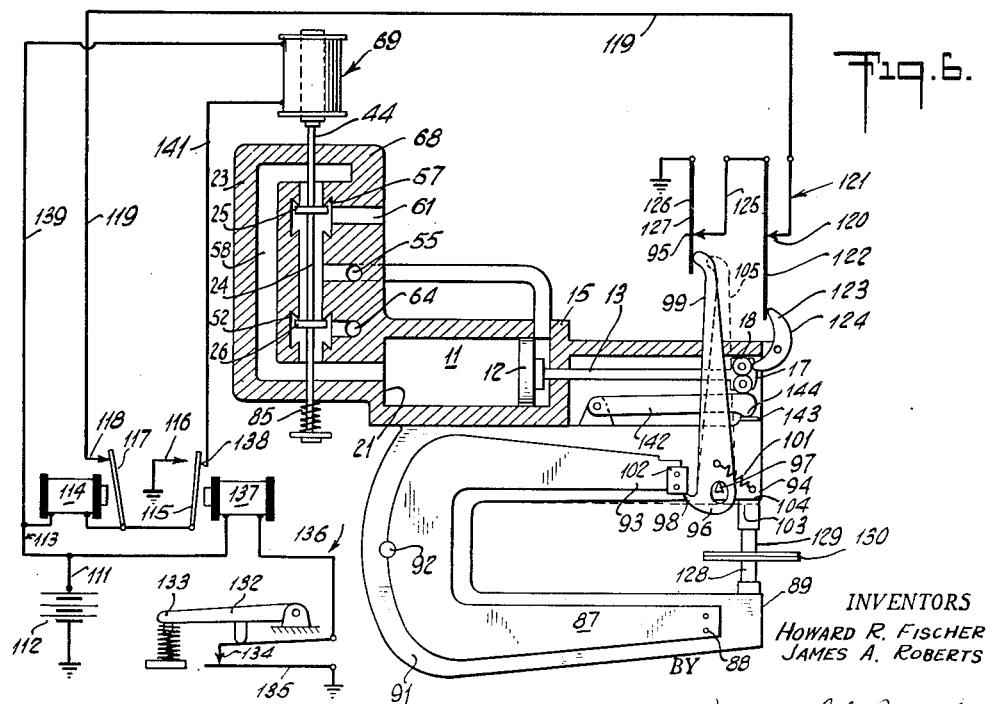
INVENTORS
HOWARD R. FISCHER
JAMES A. ROBERTS
BY Raymond G. Mullee
ATTORNEY.

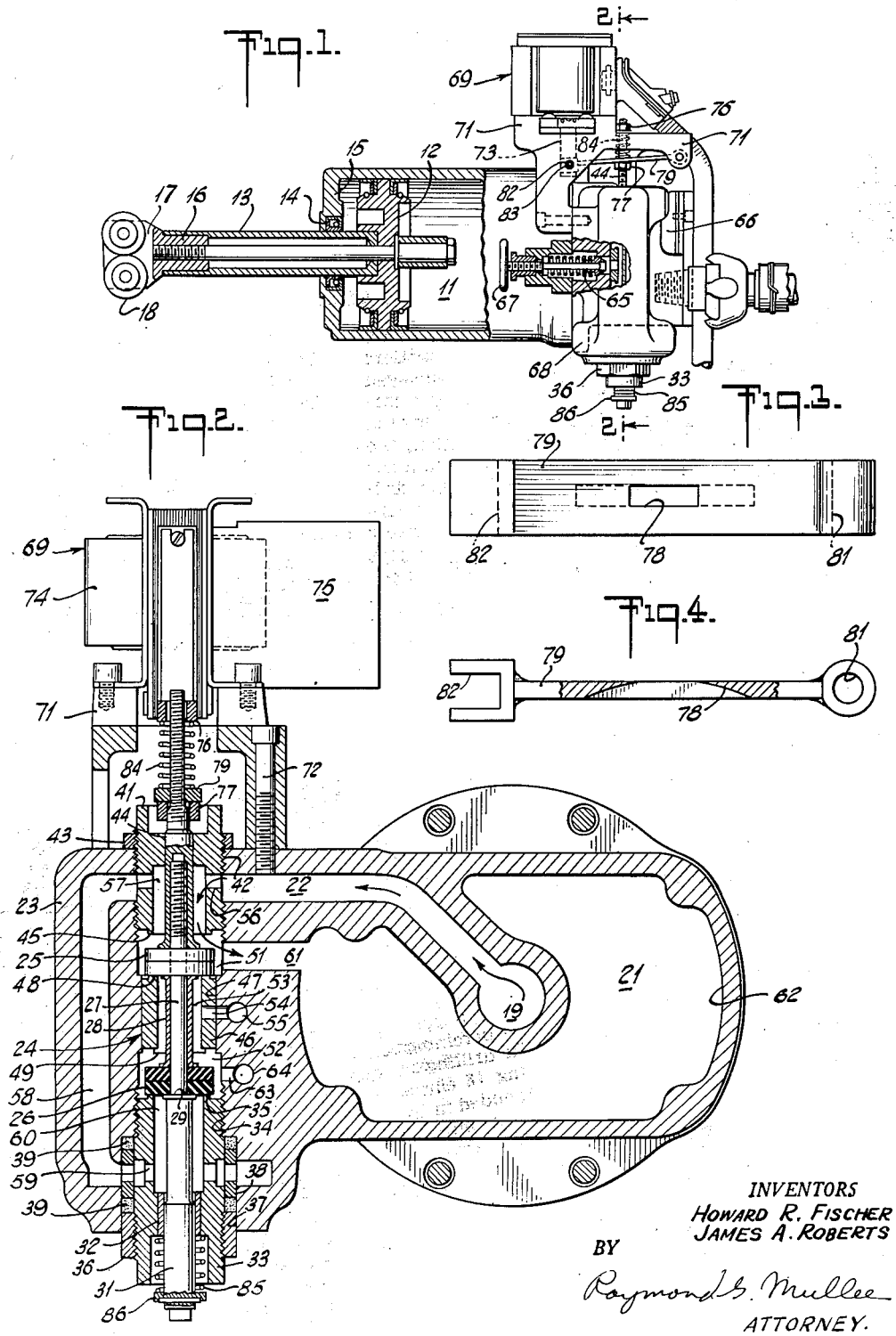

Patented Nov. 6, 1951

2,574,096

UNITED STATES PATENT OFFICE 2,574,096

DISTRIBUTING VALVE

Howard R. Fischer and James A. Roberts, Detroit, Mich., assignors to Chicago Pneumatic Tool Company, New York, N. Y., a corporation of New Jersey Original application December 13, 1943, Serial No. 514,068. Divided and this application July 26, 1946, Serial No. 686,406

2 Claims. (Cl. 121—46.5)

This invention relates to a valve and more particularly to a fluid control valve for regulating the flow of pressure fluid for reciprocating a piston associated with work engaging members in such machines as riveters, dimplers, punches, presses and similar apparatus operating on a compression principle. This application is a division of parent application, Serial No. 514,068, filed December 13, 1943 (now abandoned).

An object of this invention is to provide a fluid control valve adapted to be operated to cut off the supply of pressure fluid in one direction and instead cause the fluid to flow in the opposite direction to effect stopping and reversal of a compression machine such as a riveter or dimpler.

Another object is to provide a fluid control valve whose reciprocating member is adapted to be moved by actuating means in cooperation with gravity and spring means.

Another object is to provide a valve adapted to reverse the stroke of a piston automatically upon a predetermined degree of approach between the compression members of a riveting machine or the like.

Other objects and features of the invention will appear more clearly from the following description taken in connection with the accompanying drawings and appended claims.

In the accompanying drawings:

Fig. 1 is a fragmentary view of the upper operating mechanism of a riveting or dimpling machine with the piston and cylinder chamber and the speed control valve in section to disclose the interior construction thereof;

Fig. 2 is a cross-section along line 2—2 of Fig. 1, on a larger scale, illustrating particularly the solenoid operated valve;

Fig. 3 is a plan view, on a still larger scale, of the solenoid valve lever;

Fig. 4 is a side view, partly in section, of the solenoid valve lever;

Fig. 5 is a schematic diagram of the electric apparatus and connections showing the parts in idle condition but ready for operation; and Fig. 6 is a diagram similar to that shown in Fig. 5 showing the parts at the end of the power stroke and immediately prior to the opening of the deflection plate switch.

Still referring to the drawings, the cylinder chamber 11 (Fig. 1) contains a reciprocable piston 12 provided with a hollow piston rod 13 extending slidably through a seal 14 in the front wall 15 of the cylinder, the forward end of the piston rod receiving a boss 16 forming an extension upon a forked roller block 17 in which a pair of rotatable rollers 18 are mounted one above the other.

In order to actuate the piston just indicated, a pressure fluid port 19 (Fig. 2) in the rear wall 21 of the cylinder is arranged to receive pressure fluid (such as compressed air) from a passage 22 in valve housing 23 under control of valve 24, the fluid being introduced into the valve housing 23 through a flexible tube (not shown, but indicated at 64) connected to an appropriate source of pressure fluid. Within the valve housing 23 the valve 24 has two spaced pairs of valve heads 25, 26 mounted on a reciprocating valve stem 27, and providing four individual seating type valves, mounted in pairs, back-to-back. Valve heads 25, 26 consist of soft rubber discs each of which is perforated to fit and closely surround the valve stem 27. The discs of each pair abut each other while the pairs of heads are separated by a spacer sleeve 28. The lower disc 26 seats against a shoulder 29 on the valve stem. Near its lower end the valve stem has a cylindrical portion 31 slidable in a bushing 32 firmly fixed on a sleeve 33. Said sleeve 33 is secured by engaging in a thread 34 in the valve housing 23 and extends downwardly from said thread but is formed upon its upper end with a valve seat 35 engaged by the lower surface of valve head 26. The sleeve 33 is centered at its lower end by internally threaded ring 36 screwed on the sleeve and fitted into a large end bore 37 in the valve housing, ring 36 serving to retain the inner ring 38 as well as appropriate packing 39 above and below the same in compressed condition to prevent leakage above sleeve 33.

In the upper portion of the valve housing 23 a sleeve 41 is screwed into threads 42 and is locked in position in the housing by a lock nut 43. An upper section 44 of the valve stem is slidably supported in sleeve 41. Section 44 screws on to the upper end of stem section 27 and engages the upper face of rubber disc 25 to hold all four discs under adjustable axial compression. Sleeve 41 has a valve seat 45 at its lower end adapted to be engaged by the upper surface of valve head 25 in raised position of the valve. Between the two valve heads is located a valve seat bushing 46 held rigidly in an intermediate bore 47 in the valve housing, this bushing having an upper valve seat 48 engaged by the lower surface of valve head 25 and a lower valve seat 49 adapted to be engaged by the upper face of the other valve head 26 in raised position of the valve. It is thus evident that valve head 25 is movable from valve seat 45 to seat 48 in valve chamber 51 while valve head 26 is correspondingly movable therewith between valve seats 49 and 35 in valve chamber 52. Between these valve chambers and the bushing 46 is an annular connecting passage 53 alternately closed by valve head 25 and by head 26 while a port 54 opening into said passage communicates with a duct 55 which is connected to the front end of the cylinder chamber 11 in well understood manner.

The previously mentioned passage 22 communicates through ports 56 in sleeve 41 with an upper annular valve passage 57, said passage 22 and passage 57 connecting with a passage 58 which extends down in the valve housing toward the lower end thereof and communicates through ports 59 in the sleeve 33 and ring 38 with a lower annular valve chamber 60 in sleeve 33. The valve chamber 51 communicates by way of a passage 61 with an exhaust chamber 62 in the housing immediately behind the rear wall 21 of the cylinder. On the other hand, the valve chamber 52 communicates by way of a port 63 with the pressure fluid passage 64 which is in direct communication (not shown) with the pressure fluid supplied the flexible tube heretofore alluded to. In this connection it should be pointed out that the embodiment herein is merely illustrative and that the connections of the valve to the mechanism shown may vary. For example, valve chamber 51 could be connected to the source of pressure fluid instead of to the exhaust, and vice versa, chamber 52 could be connected to the exhaust instead of to the pressure supply.

The exhaust air flowing from the front piston chamber 11 into exhaust chamber 62 passes through speed control valve 65 (Fig. 1) which regulates piston velocity on power stroke. From the exhaust chamber it flows through muffler 66 to atmosphere. Valve 65 is of the screw type and provides an adjustable restriction for the escaping air under control of a manipulative wheel 67. The wheel 67 is supported in a flange on cylinder 68 while the valve seat is in the cylinder chamber 11. The purpose of this valve is to provide an accurate control for the velocity of travel of the piston 12 during the power stroke. Turning the adjustment wheel counterclockwise increases the speed of the piston, while clockwise adjustment decreases the speed by further restricting the flow of exhaust from the front cylinder chamber to suit riveting conditions.

The control valve 24 is raised and lowered in response to actuating means such as an electromagnetic coil device or solenoid 69. The solenoid is supported on a frame 71 (Fig. 1) which is mounted on the control valve housing 23 and secured thereto by bolts 72 (one being shown in Fig. 2). The solenoid comprises a core 73 reciprocating in a coil 74 rigidly mounted upon frame 71 and connected to a terminal box 75.

The reciprocal motion of the solenoid is transmitted to the control valve by means of a lever in the manner following. The upper valve stem 44 is screw threaded for the reception of two spaced adjusting nuts 76 and 77. Above nut 77 the sides of the valve stem 44 are flattened to fit a rectangular slot 78 in a lever 79 (see Figs. 1 to 4). The rear end of the lever has a hole 81 cooperating with a pivotal support on frame 71. The front end has a forked portion 82 engaging a horizontal pin 83 carried by solenoid core 73 whereby the reciprocating movement of the core causes the lever to rock about its pivot.

Lever 79 seats on adjusting nut 77 and is held in contact therewith by a compression spring 84 (Fig. 2) which encircles valve stem 44 and which is interposed between the lever and the upper adjusting nut 76. The two adjustment nuts and the compression spring are effective to transmit motion from the valve lever to the control valve 24. The spring 84 and nut 76 disposed above the lever 79 actuate the control valve on the upward or power stroke, whereas on the return stroke the valve 24 is carried down with the lever in contact with the adjusting nut 77. Downward movement of the valve 24 is aided by a compression spring 85 surrounding the lower end 31 of the valve stem and extending between a shoulder on sleeve member 33 and a collar 86 pinned to the valve stem. The purpose of the spring 84 is to prevent injury to the valve seats due to the inertia of the solenoid core 73 and also to obviate the necessity of close adjustments.

Referring now to the electric control system of the invention, it is apparent that when the solenoid is energized, the core 73 will promptly raise the control valve 24 to its upper limit position to engage the two valve heads 25 and 26 thereof simultaneously against valve seats 45 and 49 but when said solenoid is de-energized with incident extinction of its magnetic field by cessation of current flow through the windings thereof, the valve as promptly drops to its initial position with the valve heads 25 and 26 engaging with the valve seats 48 and 35 to effect the return stroke of the piston 12. The valve thus controls the direction and flow of the pressure fluid to the machine by controlling the inlet and exhaust ports and passages thereof as already indicated above.

The present invention includes means for automatically breaking the circuit of the solenoid to cut off the current supply thereto and thereby de-energize the same when the compression member, as for example the rivet set, has been brought down to a predetermined position, as in the case in which a head has been properly set upon the rivet, as will be explained. When this occurs, the core 73 is of course released from the magnetic field of solenoid 69 by extinction of said field which allows the spring 84 to add its effect to the force of gravity and cause the valve 24 to quickly descend and engage both valve heads against the valve seats 48 and 35. In this position of the valve, pressure fluid entering valve chamber 52 (Fig. 2) through port 63 from supply passage 64 rises through passage 53 about the intermediate portion of the valve stem, then enters port 54 and proceeds through passage 55 into the front portion of the cylinder chamber 11 driving the piston toward the rear of said chamber. In the meantime the pressure fluid initially contained in the rear portion of the cylinder chamber escapes along the path indicated by arrows in Fig. 2 through port 19, passage 22, by way of port 56 and valve passage 57 about the valve stem down to valve chamber 51 and thence through passage 61 into exhaust chamber 62 from which it finally escapes to the atmosphere. In the up position of the valve, which it assumes upon the closing of the circuit of the solenoid, the pressure fluid entering at 64 advances through port 63, valve chamber 52, annular chamber 60, ports 59, passage 58, ports 56, passage 22 and to port 19 in the rear wall 21 of the cylinder entering therethrough into the rear portion of the cylinder chamber to drive the piston forwardly. In the meantime, the pressure fluid initially contained in the forward portion of the cylinder chamber escapes through passage 55, port 54, chamber 53, chamber 51, passage 61 to exhaust chamber 62 and thence to atmosphere.

The various electrical connections and instruments used, such as switches and relays and the like, are illustrated in their details in diagrammatic form in Figs. 5 and 6. The first of these two diagrams (Fig. 5) shows the apparatus in initial condition after a main line switch 111 has been closed and the apparatus or system is ready for operation; and in both figures the parts, either simplified or modified in form, none the less are indicated as far as feasible by the same references borne by the corresponding actual parts in the other figures already described.

In the cycle of operation, referring primarily to Figs. 5 and 6, the operator first closes the line switch 111 to prepare the apparatus for initial operation. This connects the system to a source of electromotive force, diagrammatically indicated as a battery 112, and closes a circuit 113 extending from said source through the winding of a relay 114 and through a relay armature 115 and back contact (or break contact) 116 to ground. When relay 114 becomes energized, its armature 117 moves into engagement with a front contact (or make contact) 118 to connect the grounded end of the relay winding 114, through armature 117, front contact 118, and conductor 119 to a fixed contact member 120 of the stop switch 121. A movable contact member 122 of the stop switch is controlled by the end 123 of the stop switch lever 124 and is connected to a fixed contact member 125 of switch 126 while the latter has the movable grounded contact member 127 corresponding to the microswitch 95 controlled by the deflection switch trip lever 96, the upper arm 99 of which makes contact with the end of said contact member.

With the system thus in condition for action (Fig. 5) and assuming that the switch 121 and the tools 128 and 129 are set properly for the work to be performed, the work piece generally indicated at 130 is provided with a rivet 131 and placed between the riveting tools. Then the operator steps on a treadle shown diagrammatically at 132 on the foot switch 133 bringing the movable contact member 134 down into contact with a grounded fixed contact member 135 (Fig. 6) and thereby closes the circuit 136 through relay 137 and energizes said relay, immediately shifting armature 115 associated with the latter away from grounded back contact 116 into active engagement with a front contact 138 also associated with said relay. This operation of the armature 115 passes current to the solenoid 69 through conductor 139 from current source 112, the current continuing through conductor 141, through contact members 138, 115, 117 and 118, through the further conductor 119 to and through the stop switch 121 as well as trip switch 126 and finally to ground by contact member 127. The solenoid 69 instantly raises the core 73 to its upper operated position, raising the valve rod 44 and allowing pressure fluid to actuate the piston forwardly as previously described.

The forward movement of the piston 12 naturally causes the forward end or roller block 17 on the piston rod 13 to be driven forward likewise, the rollers 18 causing the cam lever 142 to be depressed, said lever in turn forcing plunger 143 down by means of cam 144 thereby forcing tool 129 down on rivet 131 mushrooming or setting the same to form a head upon the work piece 130. Should the upper roller 18 for any reason be driven beyond its normal forward limit, it will make contact with switch lever 124 and cause the upper end 123 thereof to push movable contact member 122 of stop switch 121 away from fixed contact member 120 thus opening the circuit and instantly destroying the magnetic field of the solenoid 69 and allowing the force of gravity assisted by the spring 85 to bring valve 24 down to cut off the supply of pressure fluid to the rear portion of cylinder member 11. When the piston travels toward the front of the machine, the fluid initially present in the front portion of the cylinder chamber is exhausted through passage 55, port 54, valve chamber 51, silencer 66, and speed control valve 65 to atmosphere.

In normal operation the setting of the rivet resulting in the production of a head virtually constitutes a squeezing action, imposing an expanding strain on yoke 91, but this operation when the head is fully set gradually increases the expanding strain imposed on the jaws of said yoke, and as already stated, definitely tends to separate these jaws to a measurable degree as indicated by the broken line at 103 (Fig. 6) in contrast with the relative unstrained position indicated by full line 104. The relative change in position of the jaws raises the pivot 97 fixed on jaw 94 while the lever actuating block 102 on the end 93 of the deflection plate arm remains unchanged in position, the immediate result being that the rising pivot 97 will cause the deflection switch trip lever 96 to swing counterclockwise as viewed in said Fig. 6 because the short arm 98 of the same lever is simultaneously prevented by the block 102 on the deflection plate from following the upward movement of the pivot. The upper arm 99 of the lever is thus caused to operate switch member 95 and break contact thereof with contact member 125 opening the solenoid circuit and causing the control valve 24 to cut off the supply of pressure fluid to the rear of the cylinder and stop the forward travel of the piston and consequently also stop the downward travel of the rivet set 129.

During this operation the deflection trip switch lever 96 is shifted in position about pivot 97 from that indicated in broken lines in Fig. 6 to the operated position shown in full lines, the expansion of the jaws 89, 94 of the yoke 91 causing the movement of the switch lever which is shown in the full lines at 99 in contrast with the normal free and unstrained position indicated by the broken line 105. It is of course understood that such expansion of the yoke with consequent operation of the switch lever and switch occurs at the moment when the rivet head is set to the intended degree, the adjustment for such setting being effected by means of a knob (not shown) controlling the latitude of operation of the trip switch at the front end of the machine.

From the electrical standpoint modifications are also feasible. For example, while certain of the contacts of the apparatus are diagrammatically indicated as grounded, they could well be interconnected by means of conductors, and it is likewise true that while several of the main contacts involved in the electrical control and operation of the system become effective by opening and breaking associated circuits, such contacts and circuits can readily be arranged to operate by said contacts normally being open and during operation closing the circuits, instead. Moreover, the electric circuit could be dispensed with entirely and the motion of yoke deflection transmitted to a balanced control valve through the medium of a toggle multiplying mechanism by purely mechanical means.

To those skilled in the art it is easily seen that the machine may be used not only for riveting and setting grommets and the like but may as readily be used for dimpling sheet metal, although such use has not been specifically described herein, inasmuch as a mere change of tools and adjustments is required for such dimpling operation.

What is claimed is:

1. A distributing valve comprising a valve housing having an inlet and exhaust for pressure fluid and having front and rear passages for communicating with corresponding ends of a piston chamber, two pairs of coaxial annular valve seats supported in said housing, a reciprocable valve stem axially aligned and having two pairs of annular valve heads, one pair of heads being engageable with one pair of seats when the valve stem is in a first position to connect the front passage to the inlet and the rear passage to the exhaust, the other pair of heads being engageable with the other pair of seats when the valve stem is in a second position to connect the rear passage to inlet and the front passage to exhaust, yieldable means to maintain the valve stem in first position, actuating means having a movable element, a lever pivotally connected to the movable element at one end and having a fulcrum at the other end, said lever being slotted to receive the valve stem, adjusting means to vary the relative position of the lever with respect the valve stem, and resilient means interposed between the lever and the adjusting means to dampen transmission of shocks to the valve stem, all being so arranged to effect movement of said valve stem to second position when the actuating means is activated.

2. A distributing valve according to claim 1 wherein the adjusting means comprises movable members such as nut means.

HOWARD R. FISCHER.
JAMES A. ROBERTS.

REFERENCES CITED

The following references are of record in the file of this patent:

UNITED STATES PATENTS

| Number | Name | Date |
|---|---|---|
| 691,692 | Zweigbergk | Jan. 21, 1902 |
| 1,921,092 | Newton | Aug. 8, 1933 |
| 2,139,064 | Beattie | Dec. 6, 1938 |
| 2,194,782 | Baad | Mar. 26, 1940 |
| 2,300,263 | McLeod | Oct. 27, 1942 |
| 2,313,843 | Shaff | Mar. 16, 1943 |
| 2,321,079 | Greenwald | June 8, 1943 |
| 2,340,817 | Hurst | Feb. 1, 1944 |
| 2,354,841 | Shaff | Aug. 1, 1944 |
| 2,374,593 | Ernst | Apr. 24, 1945 |